(12) United States Patent
Bulthuis et al.

(10) Patent No.: US 6,978,127 B1
(45) Date of Patent: Dec. 20, 2005

(54) HAND-EAR USER INTERFACE FOR HAND-HELD DEVICE

(75) Inventors: Willem Bulthuis, Kirkland, WA (US); Yevgeniy Eugene Shteyn, Cupertino, CA (US); Mieko Kusano, Menlo Park, CA (US); Robert Lambourne, Menlo Park, CA (US); Lisa Holzhauser, San Carlos, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/464,855

(22) Filed: Dec. 16, 1999

(51) Int. Cl.[7] .......................... H04M 1/68; H04M 3/16
(52) U.S. Cl. .................. 455/412.1; 455/412.2; 455/567; 455/569.1; 379/67; 379/68; 379/88.13; 379/433
(58) Field of Search ............... 379/433, 58, 58.13, 379/68, 67.1; 73/659; D14/487, 341; 704/258; 345/830, 785, 786; 455/412.1, 412.2, 567, 455/569.1

(56) References Cited

U.S. PATENT DOCUMENTS

| | | | | |
|---|---|---|---|---|
| 4,731,811 A | * | 3/1988 | Dubus | 379/58 |
| 5,095,503 A | * | 3/1992 | Kowalski | 579/59 |
| 5,436,954 A | * | 7/1995 | Nishiyama et al. | 379/58 |
| 5,444,768 A | * | 8/1995 | Lemaire et al. | 379/68 |
| 5,481,595 A | * | 1/1996 | Ohashi et al. | 379/67 |
| 5,495,566 A | * | 2/1996 | Kwatinetz | 395/157 |
| 5,500,919 A | * | 3/1996 | Luther | 395/2.69 |
| 5,748,104 A | * | 5/1998 | Argyroudis et al. | 340/870.11 |
| 5,758,295 A | * | 5/1998 | Ahlberg et al. | 455/566 |
| 5,774,540 A | * | 6/1998 | Davidson et al. | 379/387 |
| 5,812,870 A | * | 9/1998 | Kikinis et al. | 395/800.32 |
| 5,901,222 A | * | 5/1999 | Macor | 379/433 |
| 5,909,183 A | * | 6/1999 | Borgstahl et al. | 340/825.22 |
| 5,950,123 A | * | 9/1999 | Schwelb et al. | 455/414 |
| 5,978,689 A | * | 11/1999 | Tuoriniemi et al. | 455/569 |
| 6,097,964 A | * | 8/2000 | Nuovo et al. | 345/167 |
| 6,128,012 A | * | 10/2000 | Seidensticker, Jr. et al. | 345/336 |
| 6,161,008 A | * | 12/2000 | Lee et al. | 455/414 |
| 6,178,338 B1 | * | 1/2001 | Yamagishi et al. | 455/566 |
| 6,192,253 B1 | * | 2/2001 | Charlier et al. | 455/550 |
| 6,205,427 B1 | * | 3/2001 | Itoh et al. | 704/260 |
| 6,246,983 B1 | * | 6/2001 | Zou et al. | 704/260 |
| 2000/0105936 | * | 6/1998 | Van Der Meulen | |

FOREIGN PATENT DOCUMENTS

| | | |
|---|---|---|
| DE | 4008598 A1 | 9/1991 |
| EP | 0905951 A1 | 3/1999 |
| FR | 2769781 | 4/1999 |

OTHER PUBLICATIONS

199901511852, Jan. 1999, Ericsson.*

* cited by examiner

*Primary Examiner*—William Trost
*Assistant Examiner*—Stephen D'Agosta
(74) *Attorney, Agent, or Firm*—Kevin H. Fortin (57) ABSTRACT

A hand-held information processing device, such as a mobile phone, has a thumb wheel that lets the user scan a circular array of options. Each respective one of the options is represented by a respective audio output that gets played out when the wheel is turned a notch up or down. This enables the user to select an option with one hand and without having to look at the device. It also allows for a form factor smaller than that of a conventional mobile phones since a keypad is not needed for entering digits to make a call from a personalized directory.

4 Claims, 4 Drawing Sheets

HAND-EAR USER INTERFACE FOR HAND-HELD DEVICE

FIELD OF THE INVENTION

The invention relates in particular to a user interface for information processing devices such as mobile phones, pagers and other mobile communication devices, palmtop computers and personal digital assistants (PDA's), remote controls, devices for playing out pre-recorded information content such as music, etc. The invention is specifically relevant to hand-held devices and to apparatus used in an environment wherein the user is constrained regarding paying attention to interacting with the apparatus or device.

BACKGROUND ART

When interacting with current hand-held devices, the user typically needs to watch the device's user-interface, e.g., for selecting options from a menu of the device. For example, a typical mobile phone, PDA or remote control device requires that the user watches the keypad or touch screen when entering the desired alphanumeric characters or selecting the proper sequence of keys or icons to choose a menu option. This is considered highly undesirable when, e.g, the user is driving a car or has to focus on something else or is operating in an environment with insufficient light. Also, a visually impaired user is barred from properly interacting with such apparatus.

SUMMARY OF THE INVENTION

The invention provides a hand-held device that enables selecting options from a menu using only one hand and without having to look at the device. To this end, the information processing device of the invention comprises a user-interface for enabling a user to interact with the device. The user-interface comprises a navigating input for enabling the user to navigate in set of options; a feedback output to provide respective auditory feedback to the user about a respective selectable one of the options while the user is navigating; and a validating input to enable the user to select the current option based on the feedback.

Preferably, a hand-held version of the information processing device in the invention, such as a mobile phone, has a thumb wheel or another step-through component that lets the user scan a linear or circular array of options. Each respective one of the options is represented by a respective audio output that gets played out when the wheel is turned a notch up or down. This enables the user to select an option with one hand and without having to look at the device. It also allows for a form factor smaller than that of a conventional mobile phones since a keypad is not needed for entering digits to make a call from a personalized directory.

Incorporated herein by reference are the following patent documents:

U.S. Ser. No. 09/427,821 filed Oct. 27, 1999 for Joost Kemink and Richard Sagar for PDA HAS WIRELESS MODEM FOR REMOTE CONTROL VIA THE INTERNET. This document relates to a PDA that is combined with a wireless modem to enable remote control of CE equipment via the Internet and a local home server.

U.S. Ser. No. 09/434,155 filed May 13, 1999 for Joost Kemink for INTERNET-BASED SERVICE FOR UPDATING A PROGRAMMABLE CONTROL DEVICE. This document relates to an Internet based service for updating a programmable control device. An Internet site contains links to appliance-dependent control and feature option information which can be downloaded to the programmable control as a graphic user interface (GUI). A user interface is provided at the site for the user to easily specify a target appliance, and thereafter selectively download the interface and control information that is available for the target appliance. The Internet site also contains links to other providers of configurations and macros, such as system integrators who provide interfaces based on an inventory of the user's controllable equipment, hobbyist who share configurations and macros that they've found useful, and so on.

U.S. Ser. No. 09/160,490 filed Sep. 25, 1998 for Adrian Turner, Simon Pearce, David Eves and Allan Timms for CUSTOMIZED UPGRADING OF INTERNET-ENABLED DEVICES BASED ON USER-PROFILE, and U.S. Ser. No. 09/189,535 filed Nov. 10, 1998 for Eugene Shteyn for UPGRADING OF SYNERGETIC ASPECTS OF HOME NETWORKS, both of which relate to a server system that maintains a user profile of a particular end-user of consumer electronics network-enabled equipment and a data base of new technical features for this type of equipment. If there is a match between the profile and a new technical feature, and the user has indicated he/she is willing to receive the information about updates or sales offers, the user gets notified via the network of the option to obtain the feature. Synergy is detected between pieces of equipment of the user in order to notify him/her of further possibilities of using or expanding his/her equipment.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

Figure 1:
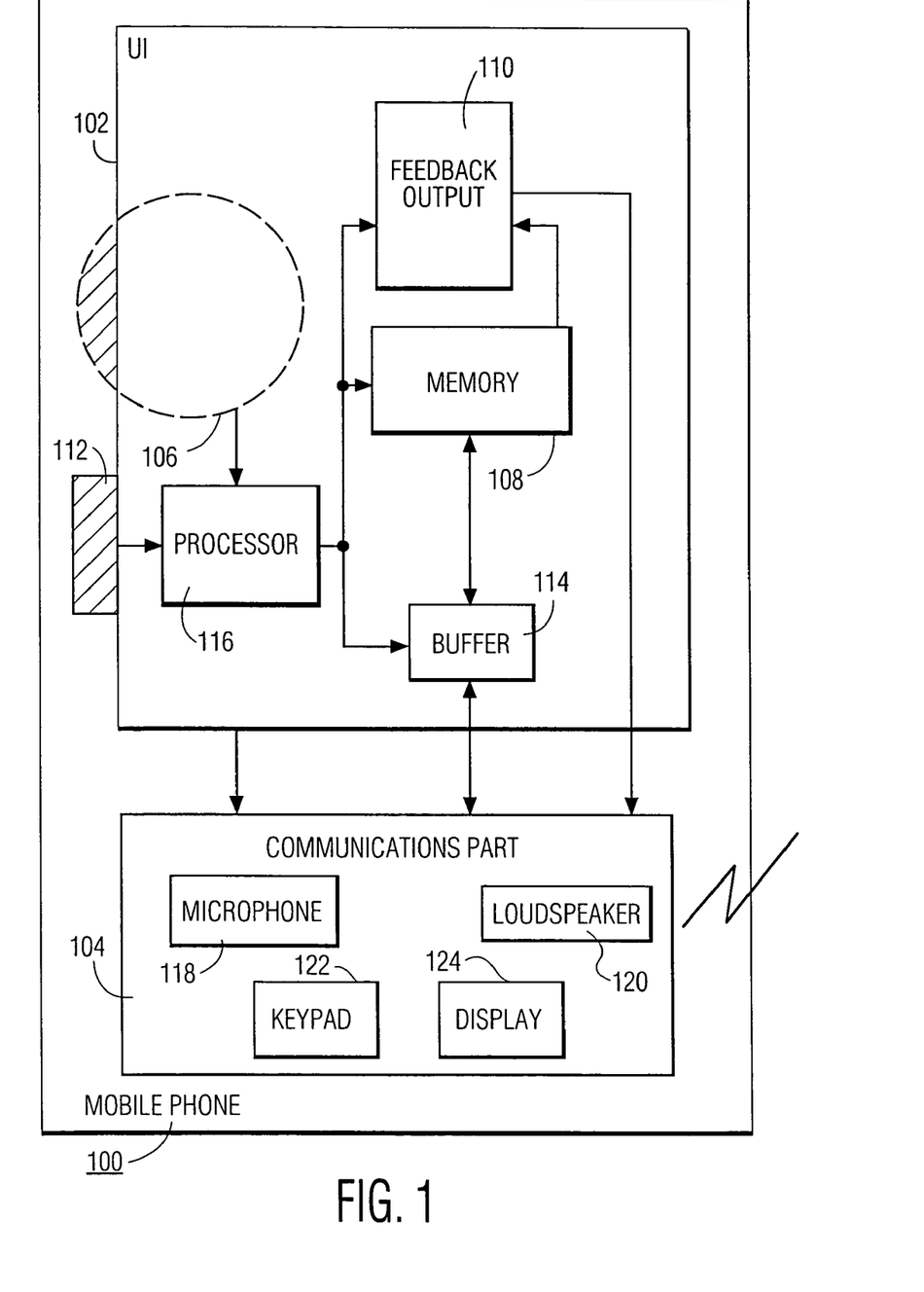
FIG. 1 is a block diagram of a mobile phone.

FIG. 1 is a block diagram of a mobile phone 100 according to the invention. Phone 100 comprises a user-interface (UI) 102 for enabling a user to interact with phone 100 and a communications part 104 that performs the wireless communication functionalities of a telephone. Part 104 is well known and is not described in further detail here. UI 102 has a navigating input 106 for enabling the user to navigate in a set of options stored in a memory 108. The options include, e.g., numeric characters as on a ordinary telephone keypad, or names arranged in a personalized directory, and are discussed more specifically below. UI 102 has a feedback output 110 to provide auditory feedback when the user comes across an option while manipulating navigation input 106. UI 102 further has a validation input 112 to enable the user to validate an option upon the auditory feedback. Validating a specific option causes the specific option to be stored in a buffer 114. The contents of buffer serves as input data for communication part 104. Navigation input and validation input are coupled to a processor 116. Processor 116 receives input signals from inputs 106 and 112 via appropriate transducers (not shown). For an example of a rotary input device, see e.g., U.S. Pat. No. 5,703,661 incorporated herein by reference; many other embodiments are known in the art. Processor 116 supplies control signals to memory 108, to feedback output 110 and to buffer 114 based on the input signals.

In this example, input 106 has a thumb wheel or other rotatable component that the user can rotate back and forth, to scan the options in a linear fashion, a circular fashion or in a more sophisticated manner, discussed below, that combines a decision tree with linear or circular scanning. Validation input 112 comprises a single key in this example. In alternative embodiments, input 106 comprises, for example, a toggle switch that can be pressed in one way for scanning the options in one direction and pressed in another way for scanning in the other direction. Inputs 106 and 112 can also be combined in a single component. For example, the thumb wheel for input 106 can be can be mounted so that it slides into device 100 against the pressure of a spring element to enable the user to use the wheel as validation input as well.

The operation of phone 100 is as follows. The user turns on phone 100 to enter input information for making a call. Assume that UI 102 allows the user to select input information in at least one of a variety of ways.

In a first manner, the user selects a telephone number through its numeric characters as follows. When the user rotates wheel 106 processor 116 scans in a circular fashion the data in memory 108 that represents the characters "0", "1", . . . , "8" and "9" as selectable options. When the user rotates wheel 106 quickly, feedback output 110 supplies audible clicks when going from a current one to the next option. When the user rotates wheel 106 slowly, feedback output 110 supplies synthesized or pre-recorded voice output, also stored in memory 108, when going from a current one to the next option. For example, the user hears the word "eight" spoken when the wheel is turned one notch forward from its current position, signifying the data "7", to the next. The "clicks" enable fast forward or fast backward, whereas the voice output identifies the currently available option. If the user has identified the desired number, he/she presses validation key 112. Processor 116 then stores the data associated with the validated option into buffer 114. Preferably, processor then also resets the starting point for the scan of the next number to, e.g., "0". Preferably, once the user has entered all numbers making up the desired telephone number, the user presses validation key 112, e.g., twice in rapid succession. This causes the contents of buffer 114 to be repeated by feedback output 110. If the user validates the selected string through key 112 the data in buffer 114 is transferred to communication part 104 for the setting up the call for the telephone number thus selected. The user thus needs only one hand to operate the phone 100 and does not need to look at UI 102.

In a second manner, memory 108 stores audio files of names associated with data that represent the telephone numbers of the parties associated with the names. The names and the audio files have been entered by the user in advance. For example, phone 100 has an operational mode for making and receiving calls, and a programming mode for programming memory 108. In the programming mode of phone 100 UI 102 uses a microphone 118, preferably the one accommodated in communication part 104 of phone 100, to enter voice data for storage into memory 108 via processor 116. The voice data represent the names or other identifiers of the parties to which the user may want to make calls frequently from phone 100. For example, the voice data to be entered are "home", "mom at home", "mom's cellular", "secretary", "Kandinsky", "Gigi", "Caius", "Svetlana" and "Philips patent department". Phone 100 comprises a sampler (not shown) and an encoder (not shown) for creating data to be stored in memory 108 representative of an audio file. Phone 100 also comprises a decoder (not shown) for playing out the audio file via feedback output 110 upon retrieval from memory 108. Feedback output 110 preferably uses a loudspeaker 120 accommodated in communication part 104 of phone 100.

Assume that the user has put phone 100 in the programming mode. While holding key 112 the user speaks the word "home" into microphone 118. The analog signals gets sampled and coded and the coded data is stored as an audio file "home" in memory 108. Processor 116 now prepares memory 108 to store the telephone number associated with the party "home". The user is prompted to enter the digits making up the telephone number into phone 100 via a keypad. The entered data are stored in buffer 114 and the number is displayed on a display 124. If the number is correct, the user validates the number via key 112 and the number is stored in memory 108 as associated with "home". The user releases key 112 and presses it again to enter the expression "mom at home" in a similar manner. The programming mode now gives the user the option to rank the audio files in a specific order. The order is relevant for the navigating later on via wheel 106 as explained below. The user has now the option to assign a rank to "mom at home" higher or lower than the rank of "home" via rotating wheel 106 up or down. When the user rotates wheel 106 a notch in one direction or the other, an audio file already stored is played out via feedback output 110, in this case the file "home". The user has, for example, some alphabetic order in mind and selects a lower rank for "mom at home". Processor 116 controls the arrangement such that the file to be stored is arranged at a rank higher or lower than the rank of the file played out last and dependent on the direction of rotation of wheel 106. The user thus presses validation key 112 after the file "home" has been played out upon wheel 106 being turned one notch down. The next entry is "mom's cellular" that is to be arranged between "home" and "mom at home". The user rotates wheel 106 down and the stored files are played out in sequence. After the file "home" is played out the user presses key 112 and the audio file "mom's cellular" gets stored with a rank lower than "home" and higher than "mom at home". Eventually, memory 108 stores the audio files and associated telephone numbers in a particular order determined by the user. Now, when the user has exited the programming mode and entered the operational mode for selecting by nickname, he/she rotates wheel 106 up or down fast to hear audible clicks for each of the selectable options (nicknames) he/she passes in a circular fashion. When the user rotates wheel 106 slowly, one audio file gets played out per notch of the wheel in the order according to the rank assigned from low to high or from high to low depending on the direction of rotation of wheel 106. In this manner, the user can select the desired party to which he/she wants to make a call. If the user has found the desired nickname, he/she presses key 112 that causes controller 116 to transfer the data representing the digits if the associated telephone number directly from memory 108 to communications part 104 to initiate the dialing procedure. Buffering in buffer 114 for checking is then not needed.

A variant of this method is that the numbers are re-ranked dynamically depending on frequency of usage. After activating the operation mode for making a call, the user gets the most frequently used audio files upon turning the wheel per notch down in decreasing or increasing order depending on the direction of rotation. This shortens the selection procedure. The re-ranking is implemented, e.g., in software. For example, a first software module logs the selections made over a certain period of time; a second software module computes the number of selections per menu option; a third module arranges the options according to the number of selections; and a fourth software module creates a dynamic look-up table to link the input via wheel 106 to the re-ranked options.

Another variant is that the numerical-digit based navigation and the nickname-based navigation form branches in a single selection tree. For example, in the initial set of options the digits "0" to "9" are concatenated with a sign "nicknames" so that the user can select in a circular manner among the telephone number by its digits or by its nickname. If the user validates a chosen digit, the procedure proceeds as discussed with the first manner. If the user validates "nicknames", the procedure switches to the second manner.

Yet another variant is that the numeric-digit-based navigation is combined with frequently used action-based navigation. For example, in the initial set of options the digits "0" to "9" are concatenated with, e.g., a "Delete Previous" option and a "Delete All" option. This type of navigation is very efficient when performed in a linear click-through manner, preferably combined with a physical limit to the rotation of wheel 106 in each direction. In order to reach the desired action, the user can fast-forward the selector towards the end or to the beginning of the range. After the physical limit has been reached, the user selects the desired option with higher precision.

Note that the keypad of a conventional mobile telephone determines the phone's form factor to a large extent. That is, the space required to accommodate a keypad is relatively large. A navigation and validation procedure of the invention enables the phone to have smaller dimensions and allows it to have shapes different from conventional mobile phones. Within this context, also see U.S. Ser. No. 09/062,364 filed Apr. 17, 1998 for Sung Choi and Jan van Ee for GRAPHICAL USER INTERFACE TOUCH SCREEN WITH AUTO ZOOM FEATURE, herein incorporated by reference. Keypad 122 could be made a module that is optionally attachable to, and detachable from, the other components of the phone 100. The sampler and encoder to enable storage of an audio file could likewise be made a detachable module to be used while programming or reprogramming memory 108.

Figure 2:
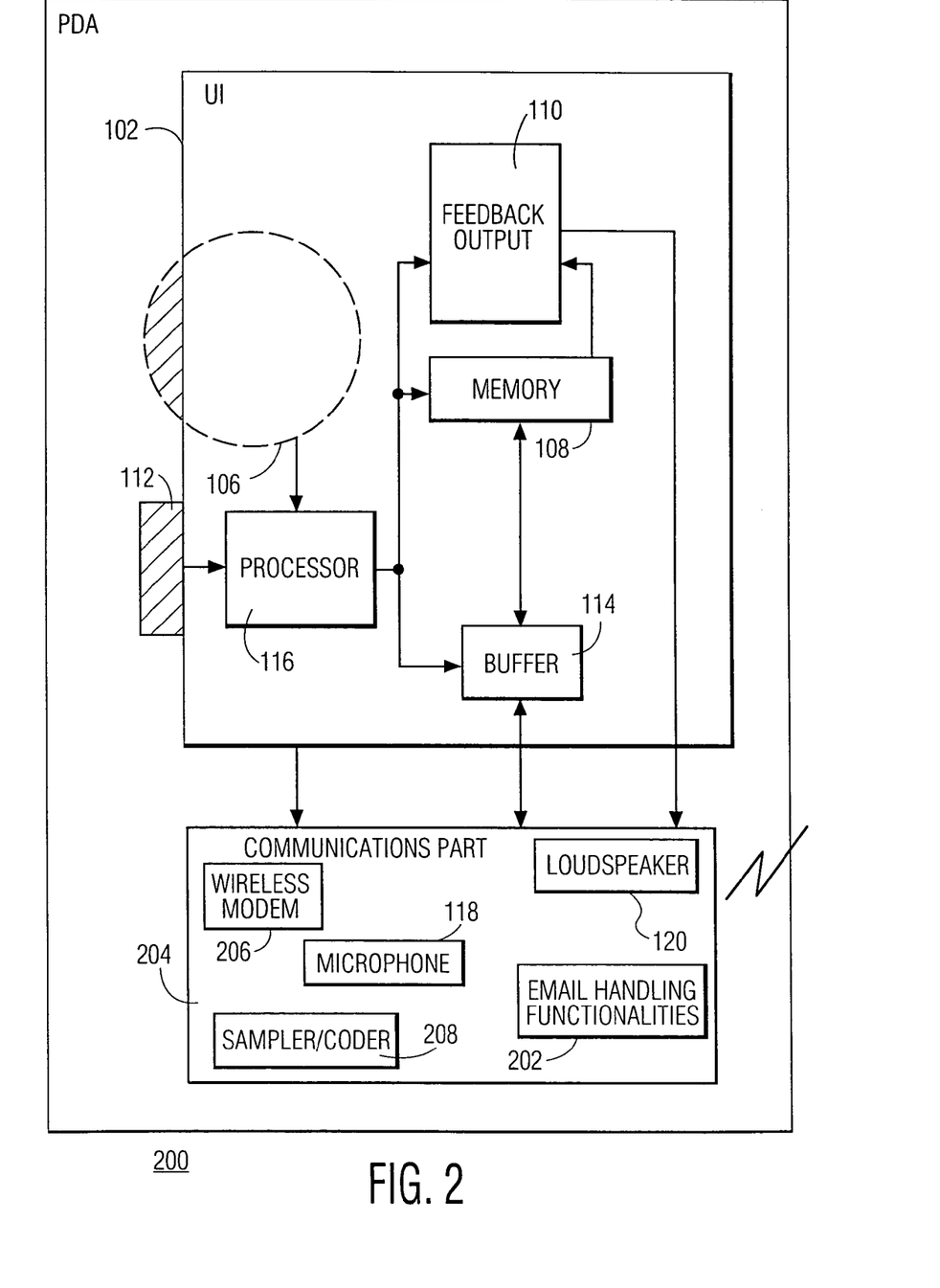
FIG. 2 is a block diagram for a palmtop computer or PDA.

FIG. 2 is a block diagram of a notebook computer or PDA 200 in the invention. PDA 200 has several software-controlled functionalities. For example, PDA 200 has a component 202 that enables a user to send and receive emails. In the PDA of the invention, the user is allowed to receive and send emails with audio file attachments. The audio file comprises content information that the user wishes to send to an addressee or receive from an sender via the Internet. The audio file may be an alternative or a supplement to a text body or text attachment as in plain emails. The audio file comprises recorded speech input from the user or from a sender, the information content being properly coded and compressed. PDA comprises a communications part 204 that has a wireless modem 206 for communication with the Internet. Modem 204 is, for example, a Minstrel or a Ricochet. The Minstrel marketed by Novatel Wireless is a two-way wireless modem for a PDA that lets the user browse the Web and receive email, among other things. In a more general sense, a wireless modem like the Minstrel or Ricochet provides handheld device 200 with an IP address that can be used by any type of application that uses the Internet for communication (within limitations of throughput, latency and coverage). The Minstrel uses a technology referred to as Cellular Digital Packet Data (CDPD) that is supported by the cellular service providers. Web surfing is limited to a CDPD speed cap of 19.2-kbps. The Ricochet from Metricom has a faster connect rate, in the 28.8 K-bps range, but it is supported in only three metropolitan centers (the San Francisco Bay area, Seattle and Washington). PDA 200 has a conversion table tying "nickname" to "email address", similar in configuration as the one for "nicknames" to "telephone number" of mobile phone 100, stored in memory 108 and discussed above under FIG. 1. The conversion table may be user-programmed or pre-defined, e.g., by a the user's company system administrator. To send an email, the user navigates through the "nicknames" rotating wheel 106. Upon validating the choice, the email header is created by the PDA through inserting the email address corresponding to the recorded nickname selected. Prior to creating the header, or after this, the user speaks into the microphone to create the content information to be sent. The speech gets sampled and coded via sampler 208 and the coded data is attached to the email. Audio sampler and coders are known in the art and are not discussed in further detail. Attaching or including audio files into emails is known in the art and is not discussed further. Upon successful completion, the user causes the email to be send, e.g., by pressing a key (not shown). Preferably, the email creation program in, e.g., controller 116 allows prompt sounds to be supplied in order to prompt the user to speak his name and/or to cite the subject of the email into microphone 118. The data created from these inputs is stored in certain fields of the email, so that the receiving party can browse through the list of senders and/or subjects by listening to the sender field and subject data field when rendered as audio. Similar functionalities are known for emails that are rendered in a text format; these need not be discussed in further detail here. Note that speech recognition software is not required on PDA 200 or on a server (not shown) as the communication is contained within the audio files whose content is to be interpreted by the user upon rendering.

As with phone 100, PDA 200 preferably has a branched menu to be navigated using wheel 106 and validation button 112. For example, the user has organized the "nickname" file according to categories "home", "office", "friends", and others. In the navigation mode, PDA 200 returns to the user the spoken names of the categories entered by the user in the programming mode. Upon validating a category during navigation, rotating of wheel 106 lets the PDA give the spoken names of the parties listed under the validated category and in the order programmed. Any level of nesting is feasible to implement this tree-like search strategy.

Note that an implementation of the invention in a network-based architecture can use an Internet service wherein the audio files and nicknames, and/or telephone number and nicknames are stored at the server for user-access, and wherein the access is via an Internet connection. The client need not be a portable device but can instead be a stationary apparatus such as a desktop PC or a desk-op telephone. A hand-held self-contained device, however, is especially interesting because of the ergonomics involved as specified above.

Figure 3:
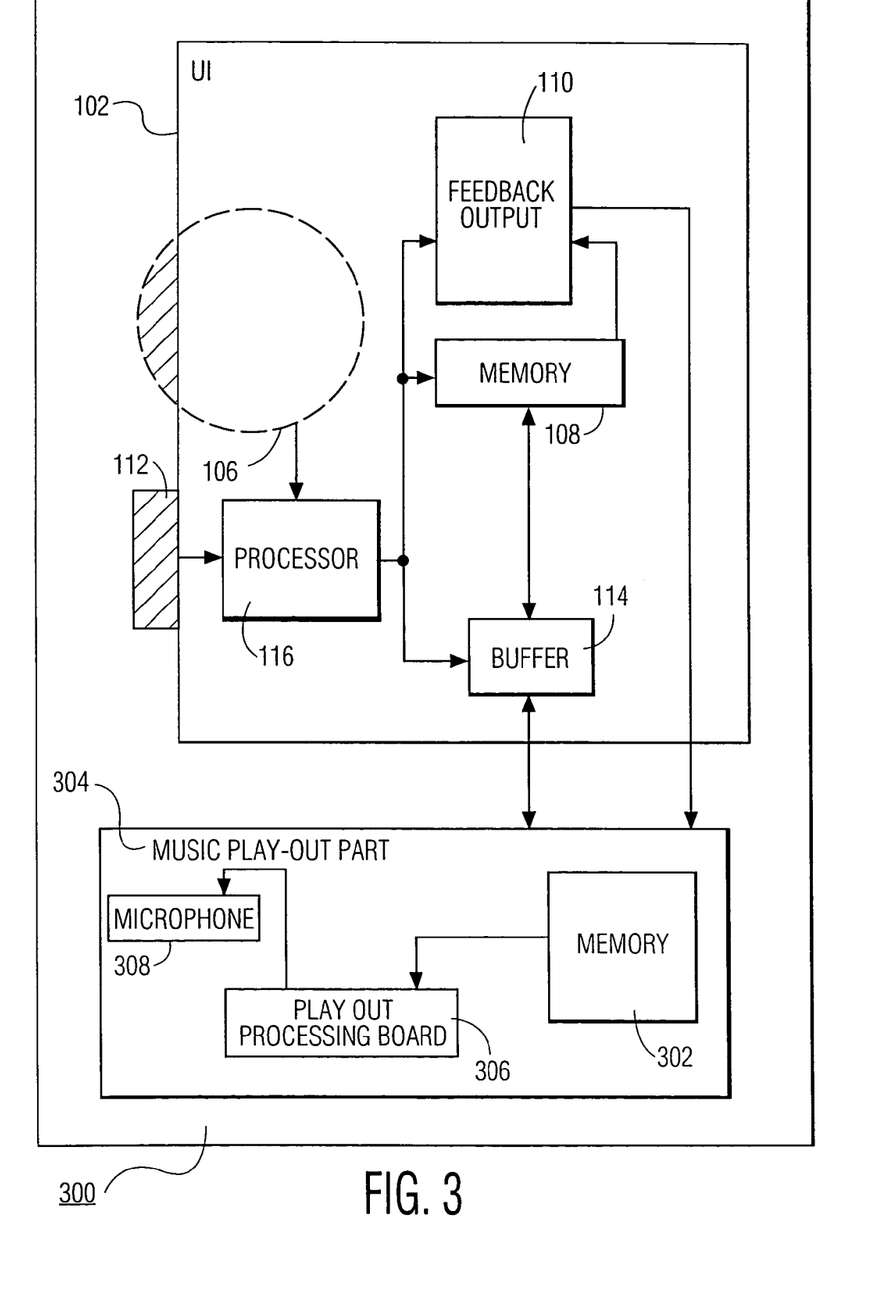
FIG. 3 is a block diagram for a device for playing back pre-recorded audio.

FIG. 3 is a block diagram of a device 300 for playing out pre-recorded audio content. Device 300 comprises a handheld jukebox wherein the user can store music files in a memory 302 that has, e.g., a recordable or re-writeable optical disk, a large semiconductor memory or a hard disk drive with a small form factor to minimize the effects of mechanical shocks. Play-out of the stored audio is achieved in, e.g., a conventional manner through play-out part 304. Play-out part 304 has a processing board 306 for rendering the stored audio, a loudspeaker 308 and, preferably, editing/ programming functionalities (not shown), known in the art, in order to enable labeling the programmed tracks for visual feedback via a GUI (not shown). Note that the GUI is preferred for the setting up of the device's library, but is not necessary during operational use of device 300. A GUT module could therefore be made detachable.

For jukebox technology see, for example, U.S. Ser. No. 09/326,506 filed Jun. 4, 1999 for Pieter van der Meulen for VIRTUAL JUKEBOX, herein incorporated by reference. This document relates to a collection management system, or virtual jukebox, provided for a collection of recordings that is independent of the physical media upon which the material is recorded.

The system forms a part of a network that includes storage media and playback devices, and provides an easy to use system for collection cataloging, archiving, and retrieval. In a preferred embodiment, a collection management system resides on a consumer electronic (CE) device, or a personal or home computer (PC), and the collection includes recordings that are stored on one or more hard drives associated with the CE device or the PC. The collection management system includes a user interface that facilitates the retrieval of recordings for playback from one or more storage devices, based on an individual selection of genre, author, and so on. By storing the recordings on a hard disc drive or other mass storage device with an associated disk operating system, immediate access is available to each recording on the drive, and additional drives can be added to the system as new material is added to the collection.

Assume that the user has stored multiple audio tracks in memory 302 and that memory 302 is accommodated in play-out part 304. Play-out processing board 306 has an intro play-out mode to play out only the first portion of each track stored. Such an intro mode is known from, e.g., the "CD player" software application, version 4.0 from Microsoft. The introductory portions or parts thereof are stored in memory 108 of UI 102 together with a label identifying the tracks from which the parts were taken. Upon rotating wheel 106 slowly, the introductory portions or parts of the tracks as stored in memory 108 are being played out via feedback part 110 and loudspeaker 120 as an auditory feedback upon navigating among the tracks. While thus navigating, the label associated with the intro being played out is stored into buffer 114. When the user validates his/her choice through key 112 the label gets fed back to play-out part 304 for playing out the whole track thus selected. When wheel 106 is being rotated rapidly, the user hears audible clicks to confirm progress along a linear or circular menu of selectable tracks or file folders.

Alternatively, when wheel 106 is rotated slowly, the relevant one of the complete audio files gets played out until wheel 106 arrives at the next notch, whereupon the play-out of the next file starts. In this embodiment, an instantaneous play-out is achieved while navigating among the options.

Alternatively or supplementarily, device 300 can be made a component in a system capable of downloading content from the Web, e.g., via a PC that serves as the master to device 300 being the slave functioning as a repository for the audio files. A combination of devices 300 and 200 is possible as a stand-alone functionality, when it is capable of accessing certain web sites that provide speech feedback for enabling the user to make the selections for the downloading, e.g., using wheel 106 and validation key 112. In a programming or downloading mode, these user inputs then function as parts of a browser to navigate in a list of audio files, similarly to the control keys of a keyboard or of a mouse when browsing the web via graphical representations rendered on a display. The web server addressed preferably provides the information in auditorily browseable pages.

Note that the some of above functionalities of phone 100, PDA 200 and music device 300 can also be implemented using a network-based system. For example, phone 100 is capable of contacting a server on the Internet. Instead of storing the names, digits or email addresses and the audio files for the auditory feedback while navigating, on the phone or PDA itself as in FIGS. 1 and 2, they are now stored at the server. The server is now an extension of the hand-held device itself with practically unlimited storage capacity for address lists and their compressed nickname audio files. The phone or PDA navigates through the options listed on the server by rotating the wheel and validating an end selection of a selection of a branch in a tree-like menu. The validated end-result is then used to enable the local functionalities of the device.

Another variant of an integrated network-based embodiment of the invention is a voice-mail system. The system enables the (mobile) user to retrieve and navigate among voice mails stored at a server. For example, when the user uses phone 100 to dial the voice-mail system number, a set of selectable items or options is activated associated with the voice-message access system. Assume that a caller-ID feature and a password have given the user access to his/her mailbox on the server. The password is entered, for example, by the user speaking an expression chosen in advance. An application on the server then determines if the expression spoken and, preferably, the signature of the user's voice in terms such as the frequency spectrum match a template stored for this user. Once the user has received access to the mailbox the user gets confirmation from the server, e.g., through a pre-recorded voice: "This is the mailbox of <username registered>. The system now makes available a list of options that contain "Next", "Previous", "Save", "Delete". Each option is mapped in phone 100 to a pulse sequence representative of a combination of alphanumeric characters as in a menu of a conventional voice mail service. The pulse sequence gets sent to the server upon pressing validation key 112. When received at the server side, the pulse sequence causes activation of the selected option. Preferably, the auditory feedback contains the name of the sender and an indication of the subject of the message. When the user confirms the selection of the message the full text gets played out. The mapping of the selection options can be manually programmed by the user, or, alternatively, via a specialized configuration tool or provided by the service provider as a service to set up the configuration of phone 100. Within this context see, e.g., U.S. Ser. No. 09/311,128 filed May 13, 1999 for Joost Kemink for INTERNET-BASED SERVICE FOR UPDATING A PROGRAMMABLE CONTROL DEVICE, incorporated herein by reference. This document relates to an Internet-based service for updating a programmable control device. An Internet site contains links to appliance-dependent control and feature option information which can be downloaded to the programmable control as a graphic user interface (GUI). A user interface is provided at the site for the user to easily specify a target appliance, and thereafter selectively download the interface and control information that is available for the target appliance.

As another example of the invention consider a universal programmable remote control device. The device has hard keys for a set of alphanumeric characters, e.g., "0" to "9", a set of apparatus selection keys, e.g., "TV", "VCR", etc., and a set of action keys such as: "Channel up/down", "Volume up/down", "Play", "Forward", "Select", etc., and UI with a wheel 106 and validation key 112, as discussed above with reference to FIGS. 1–3. The set of apparatus selection keys is limited to a rather small number of frequently used consumer appliances. The alphanumeric keys and the action keys give the user access to a greater number of apparatus and macro's than the set of apparatus selection keys allows, such as "DVD-player", "Bedroom macro's", "Time-warp recording" (as on a TiVo box), etc. Now, keys for additional apparatus can be programmed among which can be navigated through wheel 106, and from which a selection can be made through key 112. The associated auditory feedback can be programmed by recording the user's voice or by downloading a small audio file from the Web or via the user's PC for auditory rendering. When the user rotates wheel 106 slowly, the audio files get played out and validating a selection via key 112 enables the user to navigate a set of commands associated with the additional apparatus or set of macro's. The remote device has also a mapping of the keys to the various commands that enable the user to control the additional apparatus via, e.g., IR or via a control application on a PC or set top box that intermediates between the remote and the additional apparatus. Control codes for the additional apparatus can be stored in the remote as a default provision, or downloaded from the Web or from another apparatus or device. Configuring the remote can be done via, e.g., a configuration software application.

Figure 4:
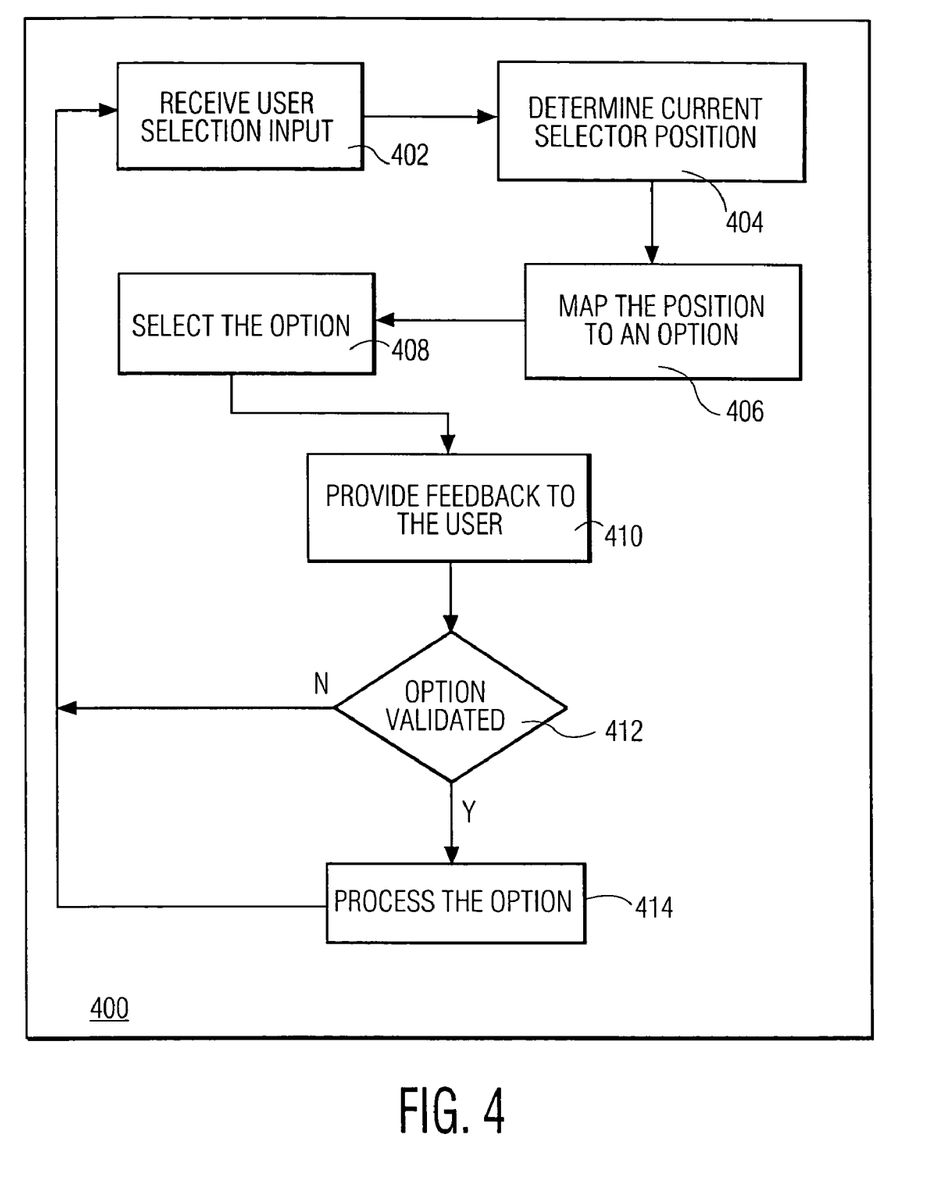
FIG. 4 is a flow diagram illustrating the operations caused by user input via the UI of the devices of FIGS. 1–3.

FIG. 4 is a flow diagram 400 illustrating the invention. In a step 402 the user input is received via wheel 106. In a step 404 the current position of the wheel is determined and in a step 406 the position is mapped on a selectable option. In a step 408 the option is temporarily selected in order to provide auditory feedback to the user in a step 410. If the user validates the option in a step 412 through key 112 the option gets processed in a step 414. If the option is not validated and the user rotates wheel 106 one notch further the process returns to step 402.

The invention has been described above in particular within the context of hand-held devices to illustrate the specific ergonomic advantages. It will be appreciated that the invention also has particular advantages with apparatus other than hand-helds. For example, the user-interface could be used on ATM or vending machines; in automotive applications where the navigating and validating input are accommodated in the steering wheel to operate, e.g., a car navigation system; on industrial machinery, etc. The invention is beneficial to the user operating under critical conditions, in terms of safety, because of its allowing to select menu options based on auditory feedback.

The thumb wheel and toggle switch have been mentioned above as special examples. Other user-controllable input components are feasible depending on the specific application. For example, the switch or wheel permits scrolling basically in two directions (up; down). A thumb- or hand-operated joystick or trackball allows scrolling in more than two directions, e.g., as in the four or eight main directions of a compass. A multidimensional option space e.g., two-dimensional with joystick is convenient for video games, e.g. for selecting weapons and firepower (it happens that this kind of video game is popular).

Optionally, speaker 120 can be a wired or wireless earpiece. Using the earpiece enables use in a noisy environment or when the environment should not be disturbed by the auditory feedback.

As mentioned above keypad is not required to be an integral part of the device according to the invention. For similar or other reasons, the device of this invention also does not need the display to be an integral part, even further reducing size and possibly costs: just a tiny speaker and a few buttons is sufficient. Accordingly, the invention thus forms not only the basis for the smallest cell phone, but also for the smallest wireless email terminal (earphone and remote control/transmitter piece): neither keyboard nor display is required with text-to-speech conversion on a server.

Another advantage of the invention is that all options can be softcoded, and can be changed over time as illustrated by above examples. Owing to the softcoding, the menu or its options can be added/removed or changed dynamically, e.g., depending on the application, environment, status and/or when new options get downloaded from a server via a network. For example, a multi-functional device uses as a first level of the menu a set of software applications, each of which is indicated to the user by a specific auditory feedback when he/she is scrolling through the list. For example, the user hears synthesized or pre-recorded speech as follows: "email"; "telephone", "pager", "music", etc., when scrolling through a main-level list. Upon selecting an application through the validation input, e.g., "email", the next level provides a menu of options relevant within the context of the application selected whose identities get auditorily rendered when the user is navigating among these options. The user can then navigate among the corresponding options (see the examples above) again using auditory feedback. Several menus can be accommodated in such a nested hierarchy.

We claim:

1. A jukebox device for the play-out of audio files comprising:

a navigating input for enabling the user to navigate in a set of audio files;

each audio file having an introductory portion;

a memory enabling the user to store audio information corresponding to each audio file;

a feedback output to provide at least a first type and second type of auditory feedback in response to the navigating input;

the first type of auditory feedback comprising a play out of the audio information corresponding to a current audio file of the set of audio files when the user is navigating at a first speed;

the second type of auditory feedback indicating a progression to a next current audio file of the set of audio files when the user is navigating at a second speed, which is relatively faster than the first speed; and a validating input to enable the user to select the current audio file in response to the feedback output, wherein the audio information comprises the introductory portion of the current audio file.

2. An information processing device comprising:

a mobile communication apparatus having a user-interface for enabling a user to interact with the device;

a navigating input for enabling the user to navigate in a set of options;

a memory enabling the user to store audio information corresponding to each option of the set of options;

a feedback output to provide a first type and a second type of auditory feedback information to the user in response to the navigating input;

the first type of auditory feedback comprising a play out of the audio information corresponding to a current option of the set of options, as indicated by the navigating input when the user is navigating at a first speed;

the second type of auditory feedback indicating only a progression to a next current option of the set of options, as indicated by the navigating input, when the user is navigating at a second, faster speed; and a validating input to enable the user to select the current option based on the provided feedback information, wherein the audio information comprises at least one recorded user-spoken word associated with a telephone extension.

3. An information processing device comprising:

a mobile communication apparatus having a user-interface;

a wireless email terminal for operating with an application server for text-to-speech conversion;

a navigating input for enabling the user to navigate in a set of options;

a memory enabling the user to store audio information corresponding to each option of the set of options;

a feedback output to provide a first type and a second type of auditory feedback information to the user in response to the navigating input;

the first type of auditory feedback comprising a play out of the audio information corresponding to a current option of the set of options, as indicated by the navigating input when the user is navigating at a first speed;

the second type of auditory feedback indicating a progression to a next current option of the set of options when the user is navigating at a second speed, which is relatively faster than the first speed; and a validating input to enable the user to select the current option, wherein the audio information comprises at least one recorded user-spoken word associated with an email address.

4. A method of enabling a user to access telephone extensions with an information processing device, comprising:

enabling the user to navigate among a set of telephone extensions;

enabling the user to store audio information corresponding to each of the telephone extensions;

providing a first type of auditory feedback information about each telephone extension, the first type of auditory feedback comprising a play out of the audio information corresponding to the telephone extension when the user is navigating at a first speed;

providing a second type of auditory feedback information about each telephone extension user when the user is navigation at a second speed that is relatively faster than the first speed; and enabling the user to validate a current one of the options, wherein the audio information comprises at least one recorded user-spoken word associated with one of the telephone extensions.

\* \* \* \* \*